(12) United States Patent
Gaul et al.

(10) Patent No.: US 9,178,564 B2
(45) Date of Patent: Nov. 3, 2015

(54) COMMUNICATION CABLE BREAKER AND METHOD USING SAME

(75) Inventors: Steven Gaul, N. Andover, MA (US); Paul Scully, Somerville, MA (US)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 802 days.

(21) Appl. No.: 13/422,207

(22) Filed: Mar. 16, 2012

(65) Prior Publication Data
US 2013/0242747 A1    Sep. 19, 2013

(51) Int. Cl.
| | |
|---|---|
| *G01R 31/08* | (2006.01) |
| *H04B 3/46* | (2015.01) |
| *H04L 12/437* | (2006.01) |
| *H04L 12/40* | (2006.01) |

(52) U.S. Cl.
CPC .............. *H04B 3/46* (2013.01); *H04L 12/40182* (2013.01); *H04L 12/437* (2013.01)

(58) Field of Classification Search
None
See application file for complete search history.

(56) References Cited

U.S. PATENT DOCUMENTS

| | | | |
|---|---|---|---|
| 2007/0025240 A1* | 2/2007 | Snide ............................. | 370/217 |
| 2008/0019501 A1* | 1/2008 | Miller et al. ................... | 379/412 |
| 2011/0066297 A1* | 3/2011 | Saberi et al. ................... | 700/287 |

FOREIGN PATENT DOCUMENTS

| | | | |
|---|---|---|---|
| DE | 102010029300 A1 | 5/2011 | |
| WO | WO 2009014581 A1 * | 1/2009 | |

OTHER PUBLICATIONS

International Search Report and Written Opinion from corresponding International Application No. PCT/US2013/031518 mailed Jun. 28, 2013.

* cited by examiner

*Primary Examiner* — Kouroush Mohebbi
(74) *Attorney, Agent, or Firm* — Lando & Anastasi LLP

(57) ABSTRACT

An industrial field bus communication cable breaking apparatus includes a housing, a first electrical connector coupled to the housing and configured to be connected to a first field bus communication cable, a first plurality of contacts disposed in the first electrical connector, a second electrical connector coupled to the housing and configured to be connected to a second field bus communication cable, a second plurality of contacts disposed in the second electrical connector, a control input configured to receive a control signal, and a plurality of switches. Each of the plurality of switches has a first end coupled to a respective one of the first plurality of contacts and a second end coupled to a respective one of the second plurality of contacts. Each of the plurality of switches is configured to simultaneously open and close based on the control signal.

18 Claims, 3 Drawing Sheets

COMMUNICATION CABLE BREAKER AND METHOD USING SAME

BACKGROUND OF THE INVENTION

1. Field of Invention

Embodiments of the invention relate generally to techniques for testing the integrity of a communication network, and more particularly, to a cable breaking apparatus and methods of testing a network using the cable breaking apparatus.

2. Discussion of Related Art

Redundant topologies may be used in communication networks to reduce or eliminate interruptions in communications caused by one or more failures in the network. Redundancy may be achieved, for example, by configuring multiple interconnections or communication paths between two or more devices on the network. In this manner, if a failure occurs along one of the communication paths, and if the failure is detected and an appropriate response is taken, the devices will still be able to communicate with each other using one of the redundant paths. This is typically referred to as a network failure event. A redundant network may be tested to ensure that the network will perform reliably during, and subsequent to, a network failure event.

One conventional technique for testing a redundant network is to physically break a communication cable to generate an actual failure, and then observe the performance of the network, for example, to determine whether and how quickly the network recovers from the failure. The failure may be achieved, for example, by manually unplugging a cable from a network patch panel. However, manual cable disconnection is difficult to coordinate with other observations and test procedures. In another conventional technique, software can be used to simulate a broken cable by halting Ethernet packet traffic. However, the software technique cannot simulate a physical cable break, in which all signals (including power, such as Power Over Ethernet (POE), if any) are interrupted.

SUMMARY OF THE INVENTION

According to one embodiment, an industrial field bus communication cable breaking apparatus includes a housing, a first electrical connector coupled to the housing and configured to be connected to a first field bus communication cable, a first plurality of contacts disposed in the first electrical connector, a second electrical connector coupled to the housing and configured to be connected to a second field bus communication cable, a second plurality of contacts disposed in the second electrical connector, a control input configured to receive a control signal, and a plurality of switches. Each of the plurality of switches has a first end coupled to a respective one of the first plurality of contacts and a second end coupled to a respective one of the second plurality of contacts. Each of the plurality of switches is configured to simultaneously open and close based on the control signal. In another embodiment, the plurality of switches may include a plurality of solid-state switches.

In one embodiment, the apparatus may further include a power source coupled to the plurality of switches for providing power to operate the plurality of switches. In another embodiment, the power source may include a battery. In yet another embodiment, the power source may include an external power supply external to the housing.

In one embodiment, the first electrical connector and the second electrical connector may each include an RJ45 modular jack. In another embodiment, the apparatus may further include a control device coupled to the control input. The control device may be configured to generate the control signal for controlling operation of the plurality of switches.

In one embodiment, the first electrical connector may be electrically isolated from the second electrical connector by the plurality of switches while each of the plurality of switches is open.

In one embodiment, the apparatus may further include at least one illuminated status indicator operatively coupled to at least one of the plurality of switches. The illuminated status indicator(s) may be configured to provide a visual indication of an operational status of the apparatus. In another embodiment, the operational status of the apparatus includes at least one of: a status indicating that the apparatus is powered on, a status indicating that an electrical connection between the first field bus communication cable and the second field bus communication cable is intact, and a status indicating that the electrical connection between the first field bus communication cable and the second field bus communication cable is broken.

According to one embodiment, a method of testing an industrial field bus communication network includes attaching a first field bus cable to a first electrical connector, the first electrical connector being operatively coupled to a first plurality of conductors, attaching a second field bus cable to a second electrical connector, the second electrical connector being operatively coupled to a second plurality of conductors, and operating at least one electrically-activated switch coupled to and interposed between the first plurality of conductors and the second plurality of conductors such that while the at least one electrically-activated switch is closed the first plurality of conductors is in electrical communication with the second plurality of conductors and while the at least one electrically-activated switch is open the first plurality of conductors is electrically isolated from the second plurality of conductors.

In one embodiment, the method may further include operatively coupling the first field bus cable and the second field bus cable to a communication network having at least one redundant communication path. In another embodiment, the method may further include opening the at least one electrically-activated switch to break a connection between the first field bus communication cable and the second field bus communication cable, and detecting an amount of time elapsed between opening the at least one electrically-activated switch and restoration of communications on the communication network via the at least one redundant communication path. In yet another embodiment, the method may further include opening the at least one electrically-activated switch to break a connection between the first field bus communication cable and the second field bus communication cable and determining whether a network failure of the communication network occurs within a predetermined amount of time after the electrically-activated switch is opened.

According to one embodiment, an industrial field bus communication cable breaking apparatus includes a housing, a first electrical connector coupled to the housing and configured to be connected to a first field bus communication cable, a second electrical connector coupled to the housing and configured to be connected to a second field bus communication cable, and means coupled to the first electrical connector and the second electrical connector for simulating a physical break between the first field bus communication cable and the second field bus communication cable.

In another embodiment, the apparatus may further include a control input configured to receive a control signal, wherein the means for simulating the physical break operates responsive to receiving the control signal. In yet another embodiment, the means for simulating the physical break includes at least one solid-state switch. In yet another embodiment, the apparatus may further include a power supply coupled to the at least one solid-state switch. In yet another embodiment, the apparatus may further include a controller coupled to the control input. The controller may be configured to generate the control signal for controlling operation of the at least one solid-state switch. In yet another embodiment, the controller may include a programmable logic controller (PLC).

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
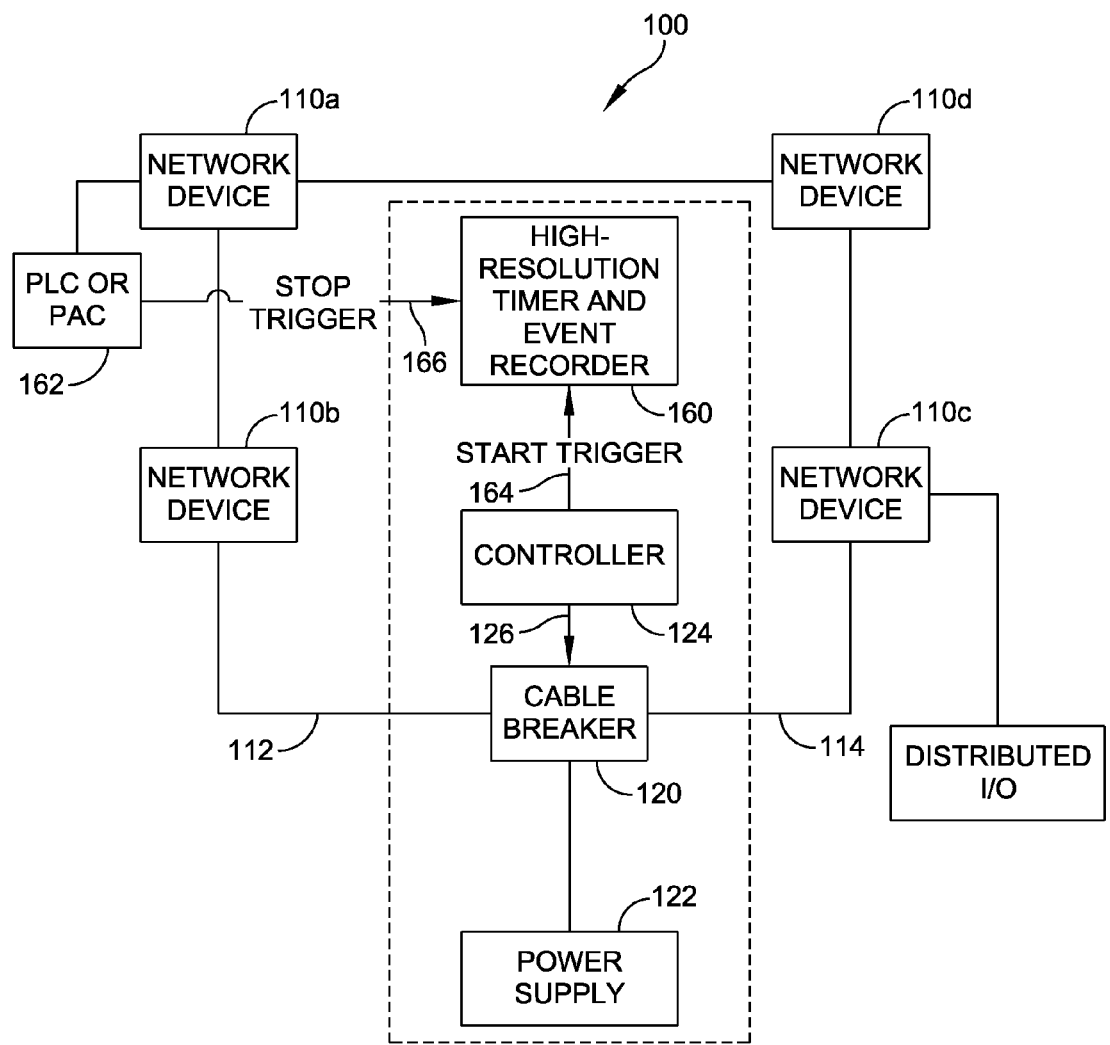
FIG. 1 is a block diagram of one example of a communication network in accordance with one embodiment.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As discussed above, one conventional technique of testing a redundant network is to simply disconnect one of the network cables from the rest of the network, which physically severs one of the network connection paths and prevents data from reaching its destination along the severed path. The network may respond to the disconnected cable by rerouting the data along a different, intact path.

It is the ability of the network to recover, and the speed at which the recovery occurs, that may be of interest to someone who is testing the network because these factors, among others, are indicators of network reliability. Therefore, according to various aspects, it is appreciated that a new technique for repetitive simulation of a broken cable in a network is needed. In particular, such a technique may be used to facilitate testing. The testing may, for example, be in-lab testing or on-site testing to prove system installation integrity and/or network recovery (healing) ability to a customer. In one embodiment, a cable breaking device is connected to two communication cables that form part of the network. The cable breaking apparatus includes a plurality of controllable switches that, depending on their respective positions (e.g., open or closed), either permit or prevent data from passing through the cable breaker. By controlling the operation of the switches, a user can simulate a broken cable without manually disconnecting any cables or using network traffic blocking software.

FIG. 1 is a block diagram of one example of a communication network 100, according to one embodiment. The network 100 may be configured, for example, to support industrial automation devices using a field bus protocol (e.g., as specified by IEC 61158), such as CANOpen, ControlNet, DeviceNet, Modbus, FIPIO, etc., or a serial bus. The network 100 includes a plurality of network devices 110a, 110b, 110c and 110d interconnected by a plurality of communication cables, including a first communication cable 112 and a second communication cable 114. The network 100 further includes a cable breaker 120 connected to the network between at least two of the network devices 110a, 110b, 110c and 110d. In various embodiments, a power supply 122 and/or a controller 124 can be coupled to the cable breaker.

In one embodiment, the cables 112 and 114 are Ethernet communication cables (e.g., Category 3, 5, 5e, 6 or 6a twisted pair cables having RJ-45 or similar connectors attached to at least one end of the cable). The cables 112 and 114 each contain four pairs of wires (for a total of eight conductors) that are terminated, for example, with pins inside a connector (not shown) for electrically coupling each wire pair with other devices on the network 100, as will be understood by one of skill in the art. It will be understood that, in some embodiments, the cables 112 and 114 are communication cables for other types of field bus networks (e.g., DeviceNet, Modbus, etc.), and that various embodiments are not limited to Ethernet.

The communication network 100 may be configured as a redundant network, i.e., a network having multiple, redundant communication paths. For example, as shown in FIG. 1, there are two paths between devices 110b and 110c: one path is a direct connection between device 110b and 110c via the cable breaker 120 using cables 112 and 114, and the other path is routed through devices 110a and 110d, which does not use either cable 112 or cable 114. Thus, in the event that the direct connection between devices 110b and 110c fails, devices 110b and 110c may still communicate with each other if network traffic is instead routed through devices 110a and 110d. The network 100 may include one or more types of devices, such as routers and bridges (not shown), that are configured to detect the failure of a communication path and restore communications by routing network traffic through alternate paths. In one embodiment, one or more of the network devices 110a, 110b, 110c and 110d are configured to act as routers, switches and/or bridges, although it will be understood that the network may include other devices that are configured to perform similar routing functions. Although schematically represented in FIG. 1 as a ring, it will be understood that the network 100 may be configured in various other topologies (e.g., partially connected mesh, fully connected mesh, etc.) that provide redundant communication paths between devices 110a, 110b, 110c and 110d.

The network devices 110a, 110b, 110c, 110d may be any type of device configured to communicate on the network, such as programmable logic controllers (PLCs) and programmable automation controllers (PACs), which are typically used in industrial automation applications. For instance, one or more of the network devices 110 may be a Modicon M340 PAC with a multi-port communication module, which is sold by Schneider Electric S.A. of Rueil-Malmaison, France. It will also be understood that the network 100 may include any number of network devices, although a network typically has at least two network devices connected to it.

Typically, cable 112 and cable 114 are directly connected to each other or formed from a single cable (not shown), forming a portion of the network 100 that, in this example, provides one communication path between and among the network devices 110a, 110b, 110c and 110d. However, as discussed above, it is sometimes desirable to simulate a broken cable to test the performance of the network under such a failure condition. In one embodiment, the cable breaker 120 may be inserted along any portion of the network. In the example of FIG. 1, the cable breaker 120 is shown connected to cables 112 and 114, although it will be understood that the cable breaker 120 may be connected to any portion of the network. One example of the cable breaker 120 will be discussed in further detail below with respect to FIG. 2.

In one embodiment, the power supply 122 is coupled to the cable breaker 120. The power supply 122 may be used, for example, to power the internal switches (described below) or other components of the cable breaker 120. Any type of power supply may be used, including, for example, a battery or an external bench top power supply (e.g., an external power supply configured to generate 24 volts DC). The power supply 122 is electrically isolated from the network 100 so that power from the power supply 122 and ground loops are not introduced into cables 112, 114 and other portions of the network 100. The power supply 122, in one embodiment, includes an on-board isolated power converter or a battery (e.g., four AA batteries), which, for example, permits the cable breaker 120 to be easily portable and provides device power isolation.

In another embodiment, the controller 124 is connected to the cable breaker 120. The controller 124 may be, for example, a PLC or other type of controller that is configured to output a discrete control signal 126 (e.g., a 24-volt signal) to the cable breaker 120. The cable breaker 120 may be configured to respond to the control signal, for example, by severing or restoring the physical connection between cables 112 and 114. The controller 124 may, for example, be programmed to control the operation of the cable breaker 120 according to a defined sequence, such as periodically severing and restoring the connection between cables 112 and 114 at predetermined regular or irregular intervals (e.g., fractions of a second, seconds, minutes, hours, etc). In one embodiment, the controller 124 is electrically isolated from the cable breaker 120, for example, by using an optical isolator for the control signal. The controller 124 may be coupled to the same network as the cable breaker or may be coupled to another network.

In another embodiment, the controller 124 may be integrated into the cable breaker 120. The controller 124 may include an on-board microcontroller and be coupled to an input device (not shown), such as a thumbwheel or selector switch. The input device may be used, for example, to program the controller 124 with a dwell or interval time for severing the connection between cables 112 and 114 on a regular basis (e.g., every minute, once per day, etc.). In this manner, the cable breaker 120 may be autonomously controlled for unattended testing or other unattended uses.

In yet another embodiment, the controller 124 includes a high-resolution timer and event recorder 160. The timer/event recorder 160 may be used for measuring the amount of time elapsed between a cable sever event and detection of the severed cable by, for example, a PLC or PAC 162 on the network 100. For example, the controller 124 may send a start trigger 164 to the timer/event recorder 160 at substantially the same time as the cable sever event begins to start a timer, and the PLC/PAC 162 may send a stop trigger 166 at substantially the same time as the PLC/PAC 162 detects the network failure. The start trigger 164 may cause the timer/event recorder 160 to begin timing and record the cable sever event. Similarly, the stop trigger 166 may cause the timer/event recorder 160 to stop timing and record the time accumulated by the timer. This, and other data, may be stored by the controller 124 in a memory for retrieval by a user.

Figure 2:
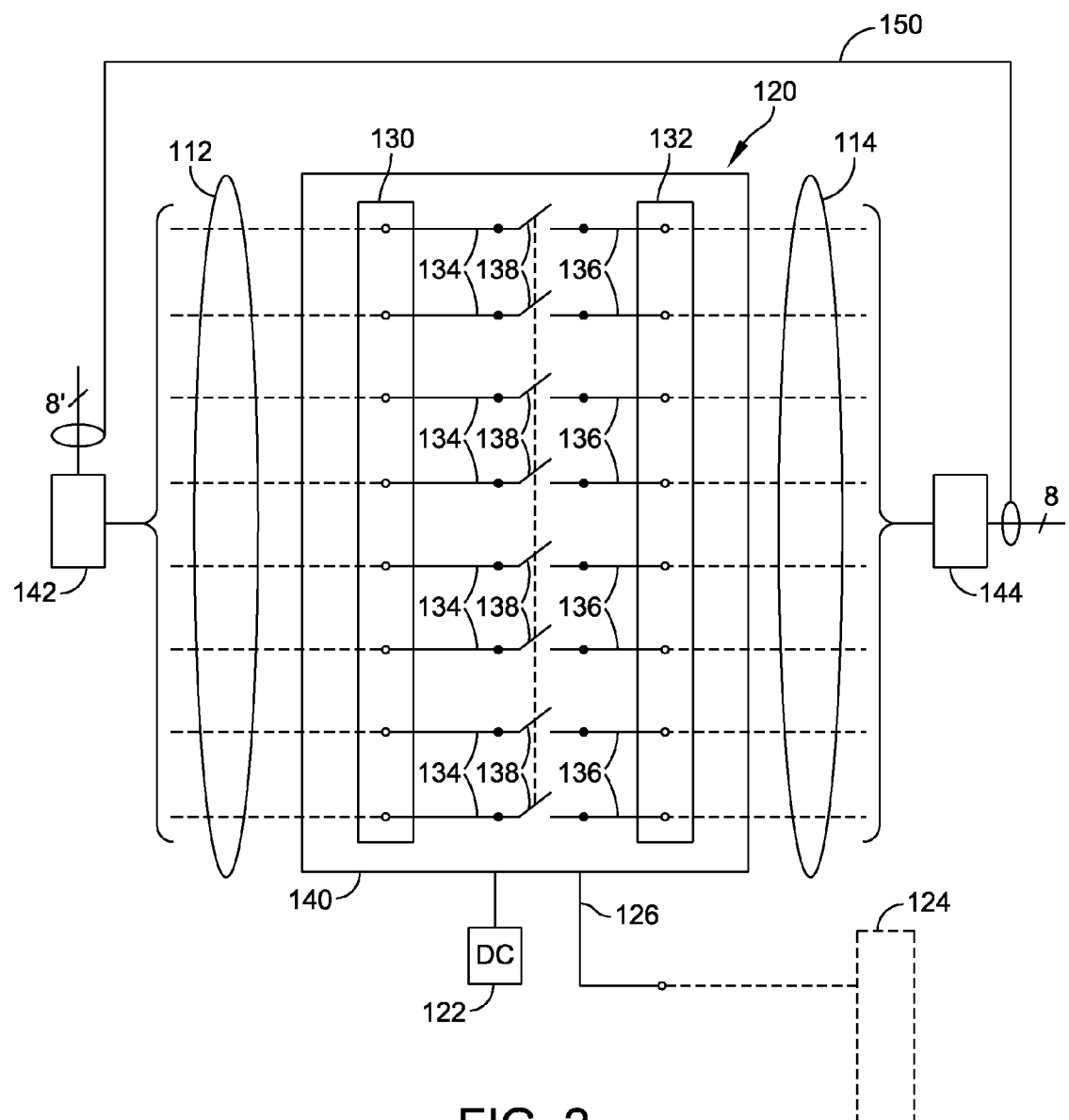
FIG. 2 is a schematic diagram of one example of a communication cable breaker in accordance with one embodiment.

FIG. 2 is a schematic diagram of one embodiment of the cable breaker 120 of FIG. 1. The cable breaker 120 includes a housing 140, and a first electrical connector 130 and a second electrical connector 132 coupled to the housing 140. The first and second connectors 130, 132 may include, for example, RJ-45 jacks (and corresponding pins) for connecting to a communication cable having a complementary (e.g., RJ-45) connector 142, 144. For example, the first connector 130 may be connected to the first communication cable 112 of the network 100 of FIG. 1, and the second connector 132 may be connected to the second communication cable 114. The first and second connectors 130, 132 may further include electrical isolation devices for isolating the first communication cable 112 from the second communication cable 114. A shield connection 150 may be coupled to the first communication cable 112 and the second communication cable 114 through the cable breaker 120.

The power supply 122 may, for example, be an on-board isolated power converter that is integrated within the housing 120, or an external bench-top power supply, such as described above with respect to FIG. 1 and shown in the embodiment of FIG. 2.

Disposed within the housing 140 is a first set of contacts 134, a second set of contacts 136 and a plurality of switches 138. Each of the first contacts 134 is coupled to a respective pin within the first electrical connector 130, and each of the second contacts 136 is coupled to a respective pin within the second electrical connector 132. If the connectors 130, 132 provide electrical isolation from the cables 112, 114, power on the first and second contacts 134, 136 may be drawn from the power supply 122. The switches 138 are coupled to corresponding pairs of contacts 134, 136. In one embodiment, the switches 138 are solid-state electrical switches (e.g., one or more HC4066 quadruple bilateral analog switch ICs manufactured by Texas Instruments of Dallas, Tex.) that may be operated synchronously (e.g., all of the switches 138 open and/or close simultaneously). Thus, when all of the switches are closed, communications on the network 100 are permitted to pass-through the cable breaker 120 substantially unimpeded. Likewise, when all of the switches are open, the communications on the network 100 (i.e., power and data) are inhibited, simulating a break in the connection between cables 112 and 114. In one embodiment, the switches 138 are configured to have a fast response time (e.g., less than 1 millisecond) and to open and close without any contact bounce. In another embodiment (not shown), each of the switches 138 are individually controllable or controllable in groups such that one or more of the switches 138 may be opened while other switches are closed to simulate partial cable breaks.

In another embodiment, the switches 138 may be high-bandwidth switches configured for fast network speeds (e.g., 1G or greater) and/or switches configured for powered devices (e.g., for devices rated above Low Power POE applications).

In one embodiment, the cable breaker 120 includes one or more timers (not shown) configured to control operation of the switches 138. The timers may, for example, be used in place of the controller 124 for controlling operation of the switches 138. For example, the timers may be configured or programmable to open and close the switches 138 at regular or irregular intervals, or upon certain triggering events. In another example, the timers may be used to provide a triggered output for starting a recovery timer. The timers may be set or activated using a user interface (not shown), such as DIP switches or push buttons.

In another embodiment, one or more illuminated indicators (not shown), such as light emitting diodes (LEDs) are mounted to the housing 120. The LEDs may be used, for example, to indicate an operational status of the cable breaker 120. For example, the LEDs may be used to indicate whether power is on, whether the cable breaker 120 is operating in a pass-through mode, whether the connection is severed, and/or other diagnostic information related to the cable breaker 120 or network traffic passing through the cable breaker 120.

Figure 3:
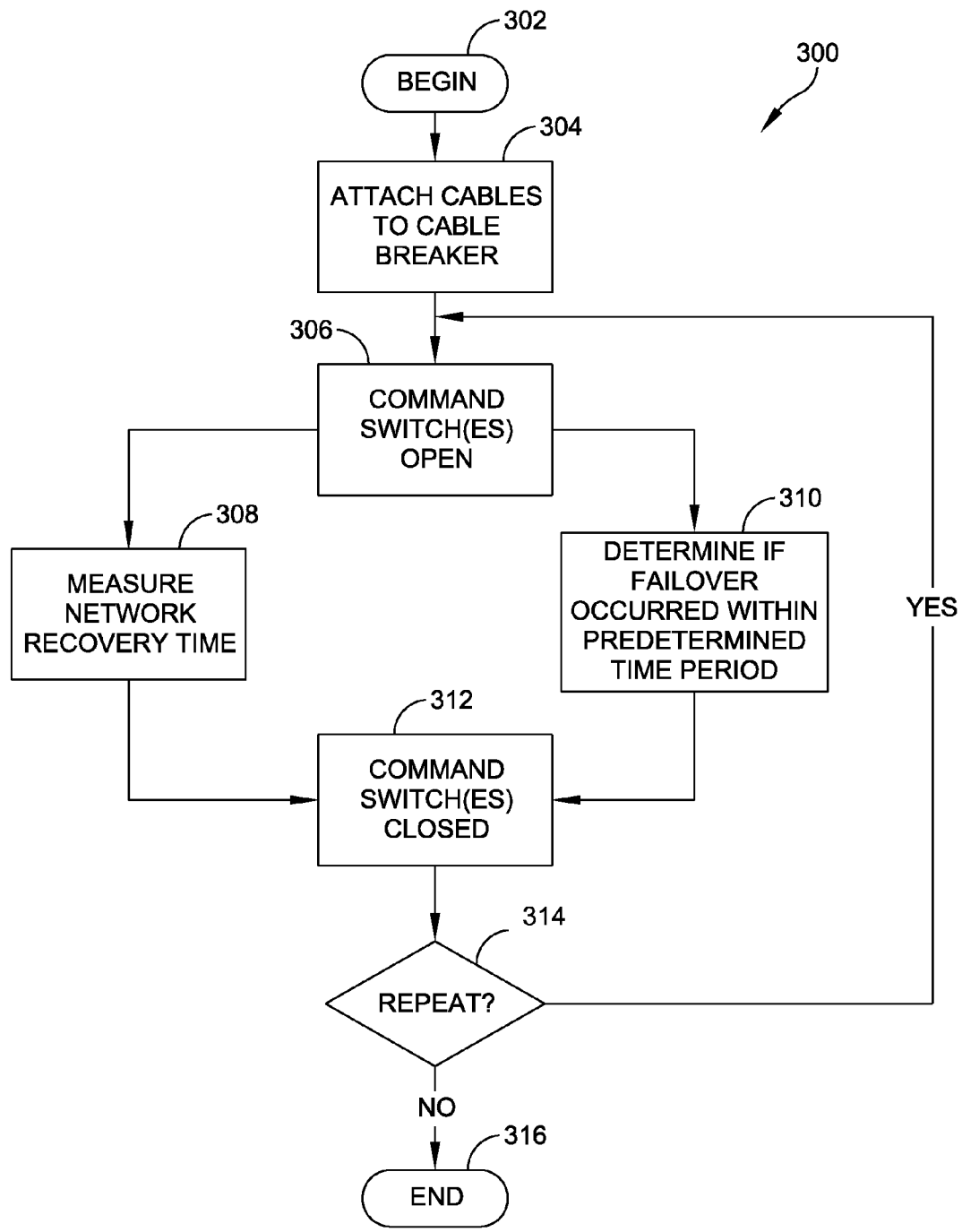
FIG. 3 is a flow diagram of one example of a process of testing a redundant network in accordance with one embodiment.

FIG. 3 is a flow diagram of one example of a process 300 of testing a redundant network, according to one embodiment. The network (i.e., including one or more devices such as a router, switch or bridge) is configured to detect the loss of a communication path (e.g., due to a broken communication cable) and switch into an alternate configuration in which communications between devices on the network are restored. Testing such a failure response may include, for example, measuring the network recovery time, determining if the failure was detected within a predetermined amount of time, determining if the network recovered within a predetermined amount of time, and/or observing other performance characteristics of the network. Testing may also include testing the performance of applications utilizing the network, ensuring that all routing paths are operational and sufficient to maintain a high level of reliability, observing the effect of a network failure on bandwidth, and determining the accuracy of communications during a network failure event.

The process 300 begins at block 302. At block 304, communications cables (e.g., Ethernet cables), which are part of a redundant communication network, are attached or connected to a cable breaker device. The cable breaker 120 described above with respect to FIGS. 1 and 2 may be used in conjunction with the process 300. As described above, the cable breaker includes one or more switches configured to permit and sever a communication path between the communications cables and through the cable breaker, depending on the state of the switches. At block 306, the switch or switches of the cable breaker are commanded to the open position, which severs the communication path and simulates a broken cable in the communication network. The switches may be manually operated or automatically operated, for example, by sending a control signal to the cable breaker device from a controller, such as described above with respect to FIG. 2. For example, if the control signal is active (e.g., +24 volts), the switches of the cable breaker are opened, simulating a broken cable. If the control signal is inactive (e.g., zero volts), the switches of the cable breaker are closed, permitting continuity between the communications cables.

As previously noted, opening the switch or switches simulates a break in the communication cables, which may interrupt communications on the network. If the network includes a redundant topology and is configured to automatically restore communications using a different communication path, it may be desirable to determine how much time elapses between the simulated failure (e.g., the point at which the switch(es) open) and restoration of communications. At block 308, the network recovery time is measured. Alternatively, it may be desirable to determine how well or how quickly the network responds to the simulated failure, which is performed at block 310. As discussed above, other tests may be performed in combination with the simulated failure.

At block 312, the switch or switches of the cable breaker are commanded closed, either manually or automatically, which restores the communication path that was previously broken. At block 314, the process may be repeated indefinitely, as desired by the user. For example, portions of the process 300 (e.g., open the switch 306, test 308, 310, close the switch 312) may be repeated at regular or irregular time intervals to test the performance of the network under various conditions over a period of time (e.g., overnight, daily, etc.) If repetition of the process 300 is not desired, the process ends at block 316.

In one embodiment, portions of the process 300 may be performed by one or more devices, including the cable breaker and/or a separate controller. In another embodiment, attaching the cables (block 304) may only need to be done once, as the cable breaker may be permanently installed into the network. Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. For example, in various embodiments, the cable breakers may be DIN rail mountable, portable, battery operated, and configured to be operable in accordance with various Ethernet or other wired local or wide area networking technologies, including networks supporting other field bus protocols (e.g., as specified by IEC 61158), such as CANOpen, ControlNet, DeviceNet, Modbus, FIPIO, etc., or a serial bus. In another example, the cable breaker may be remotely activated, such as by a wireless control signal or by an event-based trigger. In yet another example, the cable breaker may be used in a plant environment or a laboratory environment having multiple cable breakers (e.g., each networked together and each having a unique network address). The cable breaker may have a wireless network adapter for communicating wirelessly with other cable breakers in the network. One or more cable breakers may be placed throughout a plant, for example, and a laptop PC running software could wirelessly connect with each cable breaker and trigger cable severing-events repetitively, or patterns of events, etc. at the locations of the placed devices throughout the plant. This may be used, for example, as a useful way to illustrate and test (or prove to a customer) the network integrity of an installed system at commissioning. Accordingly, the foregoing description and drawings are by way of example only.

What is claimed is:

1. An industrial field bus communication cable breaking apparatus comprising:
   a housing;
   a first electrical connector coupled to the housing and configured to be connected to a first field bus communication cable;
   a first plurality of contacts disposed in the first electrical connector;
   a second electrical connector coupled to the housing and configured to be connected to a second field bus communication cable;
   a second plurality of contacts disposed in the second electrical connector;
   a control input configured to receive a control signal;
   a plurality of switches, each of the plurality of switches having a first end coupled to a respective one of the first plurality of contacts and a second end coupled to a respective one of the second plurality of contacts, each of the plurality of switches being configured to simultaneously open and close based on the control signal; and
   an event recorder configured to measure an amount of time between an opening of the plurality of switches and receipt of a notification of a severed cable.

2. The apparatus of claim 1, wherein the plurality of switches includes a plurality of solid-state switches.

3. The apparatus of claim 2, further comprising a power source coupled to the plurality of switches for providing power to operate the plurality of switches.

4. The apparatus of claim 3, wherein the power source includes a battery.

5. The apparatus of claim 3, wherein the power source includes an external power supply external to the housing.

6. The apparatus of claim 1, wherein the first electrical connector and the second electrical connector each include an RJ45 modular jack.

7. The apparatus of claim 1, further comprising a control device coupled to the control input, the control device being configured generate the control signal for controlling operation of the plurality of switches.

8. The apparatus of claim 1, wherein the first electrical connector is electrically isolated from the second electrical connector by the plurality of switches while each of the plurality of switches is open.

9. The apparatus of claim 1, further comprising at least one illuminated status indicator operatively coupled to at least one of the plurality of switches and configured to provide a visual indication of an operational status of the apparatus.

10. The apparatus of claim 9, wherein the operational status of the apparatus includes at least one of:
    a status indicating that the apparatus is powered on;
    a status indicating that an electrical connection between the first field bus communication cable and the second field bus communication cable is intact; and
    a status indicating that the electrical connection between the first field bus communication cable and the second field bus communication cable is broken.

11. A method of testing an industrial field bus communication network, the method comprising:
    attaching a first field bus cable to a first electrical connector, the first electrical connector being operatively coupled to a first plurality of conductors;
    attaching a second field bus cable to a second electrical connector, the second electrical connector being operatively coupled to a second plurality of conductors;
    operating at least one electrically-activated switch coupled to and interposed between the first plurality of conductors and the second plurality of conductors such that while the at least one electrically-activated switch is closed the first plurality of conductors is in electrical communication with the second plurality of conductors and while the at least one electrically-activated switch is open the first plurality of conductors is electrically isolated from the second plurality of conductors;
    operatively coupling the first field bus cable and the second field bus cable to a communication network having at least one redundant communication path;
    opening the at least one electrically-activated switch to break a connection between the first field bus communicator cable and the second field bus communication cable; and
    determining whether a network failure of the communication network occurs within a predetermined amount of time after the at least one electrically-activated switch is opened.

12. The method of claim 11, further comprising detecting an amount of time elapsed between opening the at least one electrically-activated switch and restoration of communications on the communication network via the at least one redundant communication path.

13. An industrial field bus communication cable breaking apparatus comprising:
    a housing;
    a first electrical connector coupled to the housing and configured to be connected to a first field bus communication cable;
    a second electrical connector coupled to the housing and configured to be connected to a second field bus communication cable;
    means coupled to the first electrical connector and the second electrical connector for simulating a physical break between the first field bus communication cable and the second field bus communication cable; and
    means for measuring an amount of time between simulating the physical break and receiving of a notification of the physical break.

14. The apparatus of claim 13, further comprising a control input configured to receive a control signal, wherein the means for simulating the physical break operates responsive to receiving the control signal.

15. The apparatus of claim 14, wherein the means for simulating the physical break includes at least one solid-state switch.

16. The apparatus of claim 15, further comprising a power supply coupled to the at least one solid-state switch.

17. The apparatus of claim 16, further comprising a controller coupled to the control input, the controller being configured to generate the control signal for controlling operation of the at least one solid-state switch.

18. The apparatus of claim 17, wherein the controller includes a programmable logic controller (PLC).

* * * * *